US012803001B2

(12) United States Patent
Park et al.

(10) Patent No.: US 12,803,001 B2
(45) Date of Patent: Nov. 17, 2026

(54) LITHIUM METAL ANODE, MANUFACTURING METHOD THEREOF, AND LITHIUM METAL BATTERY

(71) Applicant: SK ON CO., LTD., Seoul (KR)

(72) Inventors: Seong Jin Park, Daejeon (KR); Na Eun Yoon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/390,401

(22) Filed: Dec. 20, 2023

(65) Prior Publication Data

US 2024/0222639 A1 Jul. 4, 2024

(30) Foreign Application Priority Data

Dec. 30, 2022 (KR) ........................ 10-2022-0190674

(51) Int. Cl.

| | |
|---|---|
| ***H01M 4/62*** | (2006.01) |
| ***H01M 4/02*** | (2006.01) |
| ***H01M 4/04*** | (2006.01) |
| ***H01M 4/134*** | (2010.01) |
| ***H01M 4/1395*** | (2010.01) |
| ***H01M 4/38*** | (2006.01) |
| ***H01M 10/0562*** | (2010.01) |

(52) U.S. Cl.

CPC ......... *H01M 4/628* (2013.01); *H01M 4/0409* (2013.01); *H01M 4/134* (2013.01); *H01M 4/1395* (2013.01); *H01M 4/382* (2013.01); *H01M 10/0562* (2013.01); *H01M 2004/027* (2013.01); *H01M 2300/008* (2013.01)

(58) Field of Classification Search

CPC .. H01M 4/0409; H01M 4/134; H01M 4/1395; H01M 4/382; H01M 4/628; H01M 10/0562; H01M 2004/027

See application file for complete search history.

(56) References Cited

U.S. PATENT DOCUMENTS

| | | | | |
|---|---|---|---|---|
| 2020/0099046 | A1 | 3/2020 | Muldoon et al. | |
| 2021/0143412 | A1* | 5/2021 | Lee ........................ | H01M 4/133 |

(Continued)

FOREIGN PATENT DOCUMENTS

| | | | |
|---|---|---|---|
| CN | 115566189 | A | 1/2023 |
| KR | 10-2014-0125970 | A | 10/2014 |
| KR | 10-2340319 | B1 | 12/2021 |

(Continued)

OTHER PUBLICATIONS

Yin et al., "Metal chloride perovskite thin film based interfacial layer for shielding lithium metal from liquid electrolyte", Apr. 9, 2020, Nature Communications, 11, 1761, 1-9 (Year: 2020).*

(Continued)

*Primary Examiner* — Armindo Carvalho, Jr.
(74) *Attorney, Agent, or Firm* — IP&T GROUP LLP

(57) ABSTRACT

A lithium metal anode and a method of manufacturing a lithium metal anode are disclosed. In an embodiment, an anode includes a lithium metal and a protective film formed on one or both surfaces of the lithium metal and including a lithium salt and a lithium-metal alloy. In an embodiment, a method of manufacturing a lithium metal anode includes forming a protective film by bringing one or both surfaces of a lithium metal into contact with a perovskite thin film.

6 Claims, 3 Drawing Sheets

100

(56) References Cited

U.S. PATENT DOCUMENTS

| | | | | |
|---|---|---|---|---|
| 2022/0255078 | A1* | 8/2022 | Komatsu | H01M 4/134 |
| 2023/0318039 | A1* | 10/2023 | Lee | H01M 10/0568<br>429/322 |

FOREIGN PATENT DOCUMENTS

| | | | | |
|---|---|---|---|---|
| KR | 10-2022-0060989 | A | 5/2022 | |
| KR | 10-2022-0071142 | A | 5/2022 | |
| WO | WO-2022149751 | A1 * | 7/2022 | H01M 10/052 |

OTHER PUBLICATIONS

Wu et al., "All-Inorganic Lead Free Double Perovskite Li-Battery Anode Material Hosting Li+ Ion Concentrations", Apr. 22, 2021, J. Phys. Chem. Lett., 12, 17 4125-4129 (Year: 2021).*
Yin et al., "Supplementary Information; Metal chloride perovskite thin film based interfacial layer for shielding lithium metal from liquid electrolyte", Apr. 9, 2020, Nature Communications, 11, 1761, 1-46 (Year: 2020).*
Kim, T. et al., "Lithium-ion batteries: outlook on present, future, and hybridized technologies," J. Mater. Chem. A., 2019, 7, 2942-2964 (23 pages).
Extended European Search Report for European Patent Application No. 23217143.9, mailed May 28, 2024 (8 pages).
Shi, Z. et al., "Electrochemical properties of Li—Mg alloy electrodes for lithium batteries," Journal of Power Sources 92 (2001) 70-80, 11 pages.
Office Action for Korean Patent Application No. 10-2022-0190674 issued by the Korean Patent Office on Jul. 20, 2026.

* cited by examiner

LITHIUM METAL ANODE, MANUFACTURING METHOD THEREOF, AND LITHIUM METAL BATTERY

CROSS-REFERENCE TO RELATED APPLICATION(S)

This patent document claims the priority and benefits of Korean Patent Application No. 10-2022-0190674 filed on Dec. 30, 2022, the disclosure of which is incorporated herein by reference in its entirety.

TECHNICAL FIELD

The technology and implementations disclosed in this patent document generally relate to a lithium metal anode, a manufacturing method thereof, and a lithium metal battery.

BACKGROUND

Electric vehicles (EVs) are now expected to replace fossil fuel-based vehicles, which are one of the main causes of air pollution. Recently, lithium secondary batteries are used as a power source for many electric vehicles (EVs) due to high discharge voltage and power stability.

SUMMARY

The disclosed technology may be implemented in some embodiments to provide a lithium metal anode capable of suppressing the growth of lithium dendrites by inducing uniform lithium electrodeposition and effectively improving electrochemical performance, efficiency, and safety of a battery.

The disclosed technology may be implemented in some embodiments to provide a method of manufacturing a lithium metal anode to form a protective film by a simple method.

The disclosed technology may be implemented in some embodiments to provide a lithium metal anode having excellent electrochemical performance, lifespan characteristics, safety, etc., and a lithium metal battery including the same.

In some embodiments of the disclosed technology, a lithium metal anode includes: a lithium metal; and a protective film formed on one or both surfaces of the lithium metal and including a lithium salt and a lithium-metal alloy.

The lithium salt may be at least one of LiF, LiCl, LiBr, or LiI.

The lithium-metal alloy in the protective film may include an alloy that includes lithium and a lithiophilic metal.

The lithiophilic metal may be at least one metal of Ag, Sn, Mg, Au, Pt, Zn, or Pb.

The protective film may further include a perovskite compound.

The perovskite compound may include a metal halide perovskite.

The metal halide perovskite may have an $ABX_3$ structure, the A may be at least one of $Cs^+$, $Rb^+$, $MA^+$(methylammonium), or $FA^+$(formamidinium), the B may be at least one of $Sn^{2+}$, $Mg^{2+}$, $Zn^{2+}$, $Pb^{2+}$, $Ag^+$, $Au^{2+}$, $Pt^{2+}$, and $Bi^{3+}$, or the X may be at least one of $F^-$, $Cl^-$, $Br^-$, or $I^-$. The B may be a combination of $Ag^+$ and $Bi^{3+}$.

The lithium metal may include an alloy of lithium and a metal that includes aluminum, zinc, bismuth, cadmium, antimony, silicon, lead, tin, gallium, or indium.

In some embodiments of the disclosed technology, a battery includes the lithium metal; anode described above and a protective film formed on one or more surfaces of the lithium metal and including a lithium salt and a lithium-metal alloy.

The lithium metal battery may include a solid electrolyte layer, and the solid electrolyte layer includes a sulfide-based solid electrolyte.

The solid electrolyte layer may include an argyrodite-based sulfide solid electrolyte.

The lithium salt may be at least one of LiF, LiCl, LiBr, or LiI.

The lithium-metal alloy in the protective film may include an alloy that includes lithium and a lithiophilic metal.

The protective film may further include a perovskite compound.

The lithium metal may include an alloy of lithium and a metal that includes aluminum, zinc, bismuth, cadmium, antimony, silicon, lead, tin, gallium, or indium.

In some embodiments of the disclosed technology, a method of manufacturing a lithium metal anode includes: forming a protective film by bringing one or more surfaces of a lithium metal into contact with a perovskite thin film.

The perovskite thin film may be formed by applying a perovskite compound on a substrate.

The perovskite compound may include a metal halide perovskite.

The metal halide perovskite may have an $ABX_3$ structure, in which the A may be at least one of $Cs^+$, $Rb^+$, $MA^+$ (methylammonium), or $FA^+$(formamidinium), the B may be at least one of $Sn^{2+}$, $Mg^{2+}$, $Zn^{2+}$, $Pb^{2+}$, $Ag^+$, $Au^{2+}$, $Pt^{2+}$, and $Bi^{3+}$, or the X may be at least one of $F^-$, $Cl^-$, $Br^-$, or $I^-$.

BRIEF DESCRIPTION OF DRAWINGS

Certain aspects, features, and advantages of the disclosed technology are illustrated by the following detailed description with reference to the accompanying drawings.

DETAILED DESCRIPTION

Section headings are used in the present document only for ease of understanding and do not limit scope of the embodiments to the section in which they are described.

Features of the disclosed technology disclosed in this patent document are described by example embodiments with reference to the accompanying drawings. However, this is merely illustrative and the disclosed technology is not limited to specific embodiments described by way of example.

Lithium metal having a relatively high capacity (3860 mAh/g) and low redox potential (−3.04 V vs. SHE) is one of the most promising anode materials, and lithium metal battery components such as a lithium metal anode (LMA) is being developed.

Metal protrusions or dendrites of lithium generated during battery charging/discharging may significantly reduce the lifespan efficiency of batteries and cause sudden internal short-circuits, which may lead to a fire and explosions.

In an embodiment of the disclosed technology, a lithium metal anode may effectively address the issues mentioned above by forming a protective film capable of inducing uniform electrodeposition behavior and distribution of lithium ions on a surface of a lithium metal layer, and ionic conductivity and lifespan characteristics of a lithium metal battery may be improved by including such an anode. Details thereof are provided with reference to FIG. 1 hereinbelow.

Lithium Metal Anode

Figure 1:
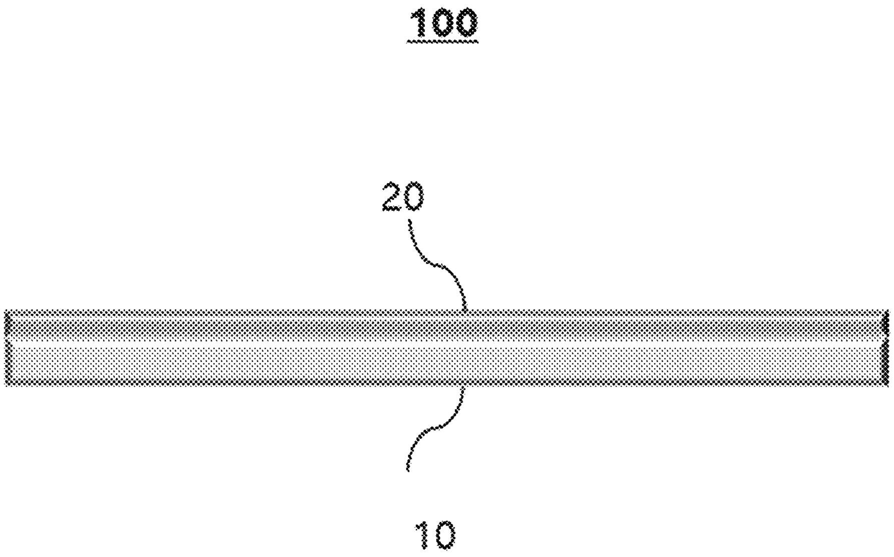
FIG. 1 is a diagram conceptually illustrating a cross-section of a lithium metal anode based on an embodiment.

FIG. 1 is a diagram conceptually illustrating a cross-section of a lithium metal anode based on an embodiment. Hereinafter, a lithium metal anode based on an embodiment will be described with reference to FIG. 1.

A lithium metal anode 100 based on an embodiment may include a lithium metal 10 and a protective film 20 formed on one or more surfaces of the lithium metal. Referring to the specific example in FIG. 1, the top and bottom surfaces of the lithium metal 10 may be both covered by the protective film 20.

The lithium metal 10 may include a pure lithium metal or a lithium metal with a protective layer formed to inhibit dendrite growth. In an embodiment, a lithium metal-containing layer deposited or coated on a negative electrode current collector may be used as a negative electrode active material layer. In an embodiment, a lithium thin film layer may be used as the negative electrode active material layer.

The lithium metal 10 may include either a lithium metal or one or more alloys thereof and may be a metal layer formed substantially of the lithium metal.

In some implementations, a thickness of the lithium metal 10 is not limited to a specific range. In some implementations, the thickness of the lithium metal 10 may be, for example, 1 μm to 200 μm.

The lithium metal anode 100 may include a protective film 20 that may effectively inhibit the growth of lithium dendrites by inducing uniform lithium electrodeposition behavior on at least one surface of the lithium metal 10.

The protective film 20 based on an embodiment may include a lithium salt and a lithium-metal alloy. The protective film 20 may include a lithiophilic material. In some implementations, the lithium-metal alloy may be a lithiophilic material. The lithium metal anode 100, in which the protective film 20 including a lithiophilic material is formed on at least one surface of the lithium metal 10, may suppress the growth of lithium dendrites and may exhibit excellent ionic conductivity and excellent mechanical strength.

The lithium salt may be a lithium halogen compound. In some implementations, the lithium halogen compound may be at least one of LiF, LiCl, LiBr, or LiI. In some implementations, the lithium halogen compound may be, specifically, LiCl, LiBr, and LiI. In some implementations, the lithium halogen compound may be LiCl. Although it is not intended to be bound by a specific theory, the protective film 20 including the lithium salt has lithium ion diffusion characteristics, thereby preventing lithium ions from concentrating on one point, thereby more effectively inhibiting the growth of lithium dendrites.

The lithium-metal alloy in the protective film may be implemented by an alloy of lithium and a metal, and the metal may be a lithiophilic metal. In some implementations, the lithiophilic metal may be at least one of Au, Ag, Pt, Al, Mg, Zn, Ni, Te, Bi, Pb, Ga, Cd, Hg, Pd, Sc, Y, Ca, Sr, Ba, Sn, Cu, or Ge. In some implementations, the lithiophilic metal may be at least one of Ag, Sn, Mg, Au, Pt, Zn, or Pb. In some implementations, the lithiophilic metal may be Ag, Sn, and Mg. The protective film 20 including the lithium-metal alloy may serve as a seed to: lower a lithium nucleation barrier by lowering a nucleation polarization overpotential during electrodeposition of lithium; induce a uniform electrodeposition behavior; and more effectively suppress the growth of lithium dendrites, thereby effectively preventing problems, such as a reduction in irreversible capacity and a short-circuit inside the battery.

The protective film 20 may further include a compound having a perovskite structure (hereinafter, referred to as a perovskite compound or perovskite). As the protective film 20 further includes a perovskite compound, the growth of lithium dendrites may be effectively suppressed.

The perovskite compound may refer to a compound having a perovskite crystal structure and may be a material having a tetrahedral, octahedral, or cubic crystal structure. Distortion of a crystal lattice occurs depending on the constituent atoms to exhibit the properties of insulators, semiconductors, and conductors and superconductivity phenomenon, etc. Specifically, the perovskite compound may include an oxide-based perovskite and a metal halide-based perovskite.

In an embodiment, the perovskite compound may be a metal halide perovskite. In one example, the perovskite compound may be a metal halide perovskite having an $ABX_3$ structure. Accordingly, the protective film 20 may have a structure that allows lithium ions to pass therethrough. In addition, the protective film 20 may suppress side reactions by preventing direct blocking between an electrolyte layer and the lithium metal anode 100, and suppress the growth of dendrites by improving mechanical strength.

The A may be a cation. In some implementations, the A may be at least one of a metal cation or an organic cation. In some implementations, the A may be at least one of an alkali metal cation or an organic cation. The organic cation may be +1-valent, specifically, may be a +1-valent organic cation including nitrogen. In some implementations, the organic cation may be at least one of an alkyl ammonium-based cation or an amidinium-based cation. For example, the A may be at least one of $Cs^+$, $Rb^+$, $MA^+$(methylammonium), or $FA^+$(Formamidinium). For example, the A may be $MA^+$.

The B may be a cation. In some implementations, the B may be a metal cation. In some implementations, the B may be +1 to +3-valent metal cations. In some implementations, the B may be a +2-valent metal cation or a combination of a +1-valent metal cation and a +3-valent metal cation.

For example, the B may be at least one of $Sn^{2+}$, $Mg^{2+}$, $Zn^{2+}$, $Pb^{2+}$, $Ag^+$, $Au^{2+}$, $Pt^{2+}$, $Bi^{3+}$, etc. For example, the B may be at least one of $Sn^{2+}$, $Mg^{2+}$, $Ag^+$, or $Bi^{3+}$.

In some implementations, the B may be at least one of $Sn^{2+}$, $Mg^{2+}$, $Zn^{2+}$, $Pb^{2+}$, $Au^{2+}$, $Pt^{2+}$, etc. or a combination of $Ag^+$ and $Bi^{3+}$. In some implementations, the B may be at least one selected from the group consisting of $Sn^{2+}$ and $Mg^{2+}$ or a combination of $Ag^+$ and $Bi^{3+}$. In some implementations, the B may be $Sn^{2+}$.

In some implementations, the X may be at least one of $F^-$, $Cl^-$, $Br^-$, or $I^-$. In some implementations, the X may be at least one of $Cl^-$, $Br^-$, or $I^-$. In some implementations, the X may be $Cl^-$.

In some implementations, a thickness of the protective film 20 may be 500 nm to 10 μm. In some implementations, a thickness of the protective film 20 may be 500 nm to 5 μm. a thickness of the protective film 20 may be 1 μm to 3 μm.

When the thickness of the protective film 20 is within the aforementioned range, the mechanical strength and electrochemical performance of the lithium metal anode may be excellent.

The manufacturing method of the lithium metal anode 100 is not particularly limited, but, for example, the lithium metal anode 100 may be manufactured by a lithium metal anode manufacturing method described below.

Anode Manufacturing Method

Figure 2:
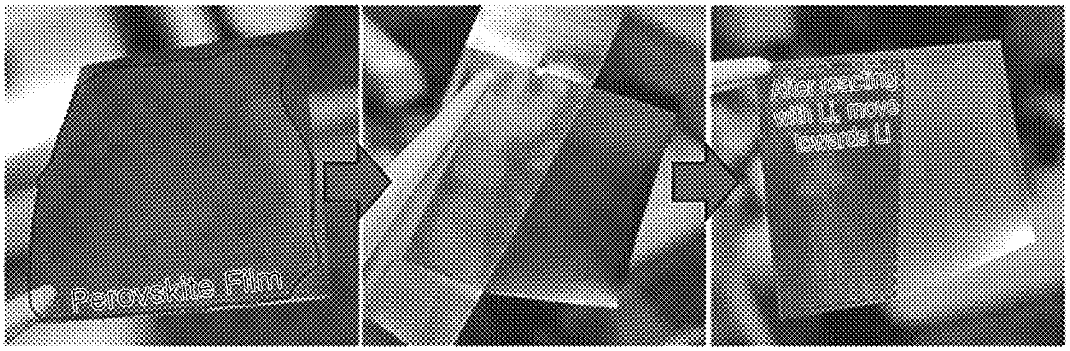
FIG. 2 is an image illustrating a method of manufacturing a lithium metal anode based on an embodiment.
Figure 3:
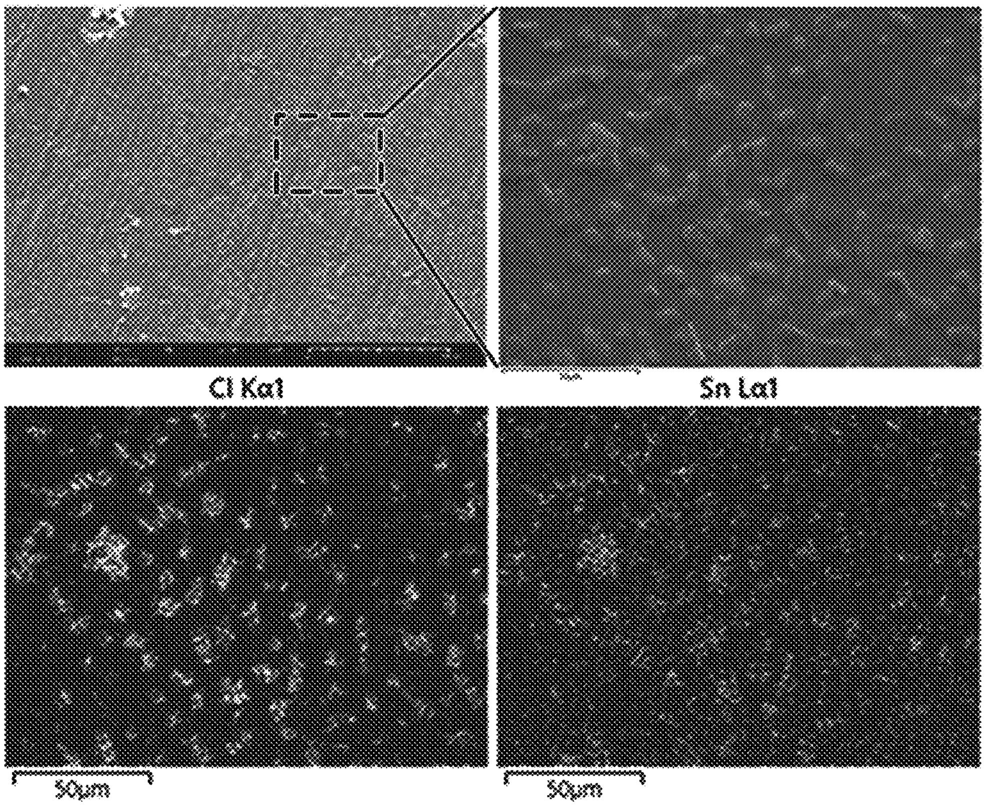
FIG. 3 illustrates an SEM image of a perovskite thin film formed on a substrate.

FIG. 2 is an image illustrating a method of manufacturing a lithium metal anode based on an embodiment. Hereinafter, a method of manufacturing a lithium metal anode based on an embodiment will be described with reference to FIG. 2.

A method of manufacturing the lithium metal anode 100 based on an embodiment may include forming a protective film by bringing one or both surfaces of the lithium metal into contact with a perovskite thin film. In some implementations, the protective film may be formed by placing a perovskite thin film on one or both surfaces of the lithium metal.

The method of manufacturing a lithium metal anode based on an embodiment may include the following operations. In some implementations, a protective film may be formed through a spontaneous reaction between the lithium metal 10 and perovskite, thereby forming a thin protective film.

In addition, the method of manufacturing a lithium metal anode based on some embodiments of the disclosed technology may include forming a protective film through a simple method without separate equipment, thereby reducing costs and manufacturing time.

The one or both surfaces of the lithium metal may be brought into contact with the perovskite thin film in various ways. For example, after bringing the lithium metal 10 into contact with the perovskite thin film, a certain pressure may be applied thereto for a predetermined period of time. For example, perovskite particles may be applied to the surface of lithium metal 10.

The perovskite thin film may be manufactured by applying a perovskite compound to a substrate. In some implementations, the perovskite compound may be applied to a substrate in various ways. For example, the perovskite may be applied to the substrate through a spin coater method or a tape casting method using a doctor blade. In some implementations, the perovskite may have features as described above.

The method for forming the perovskite thin film may include applying an anti-solvent on the substrate to which the perovskite compound is applied. The anti-solvent may reduce the solubility of perovskite and prevent perovskite from agglomerating and growing on the substrate, which may help achieve uniform coating.

The anti-solvent is not limited to a specific material as long as it is a solvent that quickly extracts an existing solvent. In some implementations, the anti-solvent may include at least one of chlorobenzene, trifluorotoluene, bromobenzene, dichlorobenzene, diethyl ether, dichloromethane, trichloromethane, acetonitrile, diisopropylether, iodobenzene, 1-butanol, isobutanol, ethanol, ethyl acetate, or isopropanol.

The method for forming the perovskite thin film may include drying the substrate coated with the anti-solvent by heating. The drying operation causes a precursor to become a metal halide perovskite and may help remove the remaining solvent.

The substrate allows perovskite to be evenly applied on lithium metal. In some implementations, a material of the substrate may be, for example, at least one of stainless steel, copper foil, aluminum foil, or lithium foil. In some implementations, the material of the substrate is not limited to a specific material as long as it is formed of a material that does not react with perovskite.

Lithium Metal Battery

A lithium metal battery based on an embodiment may include the lithium metal anode 100 implemented as discussed above. Specifically, the lithium metal battery may include the lithium metal anode 100, a positive electrode, and an electrolyte as discussed above, and may or may not further include a separator selectively.

The positive electrode is not particularly limited as long as it is commonly used in secondary batteries, and may include a lithium-transition metal composite oxide as a positive electrode active material and may include, for example, lithium-transition metal oxides, such as lithium cobalt oxide ($LiCoO_2$), lithium manganese oxide ($LiMn_2O_4$), or lithium nickel oxide (LiNiO2) or lithium-transition metal complex oxides in which some of these transition metals are replaced with other transition metals.

Specifically, the lithium-transition metal complex oxide may be an NCM-based positive electrode active material represented by a chemical formula of $LiaNibM_{1-b}O_2$. Here, $0.9 \leq a \leq 1.2$, $0.5 \leq b < 1$, and M is at least one of Na, Mg, Ca, Y, Ti, Hf, V, Nb, Ta, Cr, Mo, W, Mn, Co, Fe, Cu, Ag, Zn, B, Al, Ga, C, Si, Sn, Ba, or Zr. Specifically, $0.95 \leq a \leq 1.08$ may be satisfied, and b may be 0.6 or greater, 0.8 or greater, exceed 0.8, 0.9 or greater, or 0.98 or greater. In some implementations, M may include Co, Mn, or Al. In some implementations, M may include Co and Mn and may further include Al selectively.

In addition, the positive electrode active material may be a lithium iron phosphate (LFP)-based positive electrode active material represented by a chemical formula of $LifePO_4$. In addition, the positive electrode active material may be an LLO (e.g., Li rich layered oxides, Over Lithiated Oxides, Over-lithiated layered oxide, OLO, LLOs)-based positive electrode active material represented by a chemical formula of $Li_{1+x}M_{1-x}O_2$. Here, $0 \leq x \leq 0.4$, M is at least one of Na, Mg, Ca, Y, Ti, Hf, V, Nb, Ta, Cr, Mo, W, Ni, Mn, Co, Fe, Cu, Ag, Zn, B, Al, Ga, C, Si, Sn, Ba, or Zr. In some implementations, M may include Ni, Co, Mn, or Al. In some implementations, M may include Ni, Co, and Mn. In some implementations, M may further include Al selectively.

In addition, the lithium-transition metal oxide may be a secondary particle including a plurality of primary particles that are aggregated to form substantially one particle, or may be in the form of a single particle. The single particle form may be a particle excluding a secondary particle substantially formed as a plurality of primary particles (e.g., exceeding ten particles) that are aggregated to form substantially one particle. However, the single particle form does not exclude the situation that two to ten single particles are attached or closely adhered to each other to have a monolithic form. In some embodiments, the positive electrode active material may include both the secondary particle form and the single particle form.

The lithium metal battery may or may not further include a separator, and when the lithium metal battery further includes a separator, the separator is not particularly limited as long as it is applicable to a typical lithium secondary battery. For example, the separator may include a porous substrate, and the porous substrate may be a polyolefin-based porous substrate. The polyolefin-based porous substrate may have a plurality of pores and may be a substrate commonly used in electrochemical devices. For example, the polyolefin-based porous substrate may be of a polyethylene single film, a polypropylene single film, a polyethylene/polypropylene double film, a polypropylene/polyethylene/polypropylene triple film, or a polyethylene/polypropylene/polyethylene triple film, but the disclosed technology is not limited thereto.

The lithium metal battery may be disposed together with an electrolyte in a separate case. Here, the electrolyte may be a liquid electrolyte including a lithium salt and an organic solvent. The lithium salt may be represented by a chemical formula $Li^+X^-$ and may include one or two or more of $F^-$, $Cl^-$, $Br^-$, $I^-$, $NO_3^-$, $N(CN)_2^-$, $BF_4^-$, $ClO_4^-$, and $PF_6^-$ as anions (X−), but the disclosed technology is not limited thereto. In addition, the organic solvent may include, for example, one or two or more of propylene carbonate (PC), ethylene carbonate (EC), diethyl carbonate (DEC), dimethyl carbonate (DMC), and ethylmethyl carbonate (EMC), but the disclosed technology is not limited thereto.

In some implementations, the lithium metal battery may be an all-solid-state battery including the lithium metal anode 100, a positive electrode, and a solid electrolyte layer located between the lithium metal anode 100 and the positive electrode implemented as discussed above.

The solid electrolyte included in the solid electrolyte layer is not limited to a specific electrolyte. In some implementations, the solid electrolyte may include at least one of common solid electrolytes. For example, the solid electrolyte may include an oxide-based solid electrolyte, such as $Li_7La_3Zr_2O_{12}$(LLZO); sulfide-based solid electrolytes, such as thio-LISICON, β-$Li_3PS_4$, $Li_7P_3S_{11}$, $Li_2S—P_2S_5$, LGPS, and azirodite; or polymer-based solid electrolytes, such as (1) a solid polymer electrolyte formed by adding a polymer resin, such as a polyether polymer, to a lithium salt, (2) a polymer gel electrolyte in which a polymer resin is impregnated with an organic electrolyte solution including an organic solvent and lithium salt.

In an embodiment, the solid electrolyte layer may include a sulfide-based solid electrolyte. Specifically, the sulfide-based solid electrolyte may be an argyrodite-based sulfide solid electrolyte represented by $Li^+_aA_b^+Q_cX^{-d}$ (1≤a≤12, 0≤b≤5, 0≤c≤10, and 0≤d≤2, A may be at least one of P, As, Ge, Ga, Sb, Si, Sn, Al, In, Ti, V, Nb, or Ta, Q may be at least one of S, Se, or Te, and X may be at least one of Cl, Br, I, F, CN, OCN, SCN, or $N_3$). Specifically, the azirodite-based sulfide solid electrolyte may be a compound represented by a chemical formula of $Li_{7-x}PS_{6-x}Cl_x$ (0≤x≤2), $Li_{7-x}PS_{6-x}Br_x$ (0≤x≤2), or $Li_{7-x}PS_{6-x}I_x$ (0≤x≤2), and more specifically, the sulfide-based solid electrolyte may include $Li_6PS_5Cl$, $Li_{6.5}Sb_{0.5}Ge_{0.5}S_5I$, $Li_{5.7}PS_{4.7}Cl_{1.3}$, $Li_{6.6}Sb_{0.5}Si_{0.6}S_5I$, etc.

In an embodiment, when the lithium metal battery has a solid electrolyte layer including the aforementioned lithium metal anode and an azirodite-based sulfide solid electrolyte, lithium ions may be uniformly electrodeposited, while exhibiting high ionic conductivity, and excellent ionic conductivity and mechanical strength may be secured.

When the lithium metal battery includes the aforementioned lithium metal anode 100, the growth of lithium dendrites may be effectively suppressed by the protective film 20, which may induce a uniform lithium electrodeposition behavior, thereby improving lifespan characteristics, electrochemical performance, safety, etc.

EXAMPLE

Hereinafter, embodiments of the disclosed technology will be further described with reference to specific experimental examples. Example and Comparative Example included in the experimental examples only illustrate the disclosed technology and do not limit the scope of the disclosed technology.

Example 1

1. Manufacturing of Perovskite-Treated Lithium Metal Anode 0.338 g of methylamine hydrochloride ($CH_3NH_2$. HCl) and 0.948 g of stannous chloride ($SnCl_2$) were dissolved in 10 ml of N,N-dimethylformamide to prepare a precursor solution of 0.5 M of metal halide perovskite $MaSnCl_3$ ($CH_3NH_3SnCl_3$).

The prepared precursor solution was applied on a stainless steel substrate and coated with a spin coater at 2000 r/min for 90 seconds. 15 seconds after the spin coater started operating, 1.5 ml of chlorobenzene was applied on the substrate, and then dried at 70° C. for 5 minutes to produce a substrate coated with a perovskite thin film.

The perovskite thin film-coated substrate and lithium metal were brought into contact with each other in a facing manner with a force of 10 N for 10 seconds. Thereafter, the lithium metal and the perovskite thin film were separated to produce a lithium metal anode with a protective film formed on a surface of lithium metal.

2. Manufacturing of Lithium Metal Electrode

A 2032 coin-type lithium metal symmetrical battery was manufactured using the lithium metal anode manufactured as described above, a polyolefin-based separator coated on a ceramic-based inorganic material, and 1.0M $LiPF_6^-$EC/EMC(3/7, vol %)+2 wt % FEC electrolyte.

Comparative Example 1

A lithium metal electrode was manufactured in the same manner as that of Example 1 using a lithium metal anode without a treatment with a perovskite compound.

Evaluation Example

1. Evaluation of Electrodeposited Lithium Metal Anode

Figure 4:
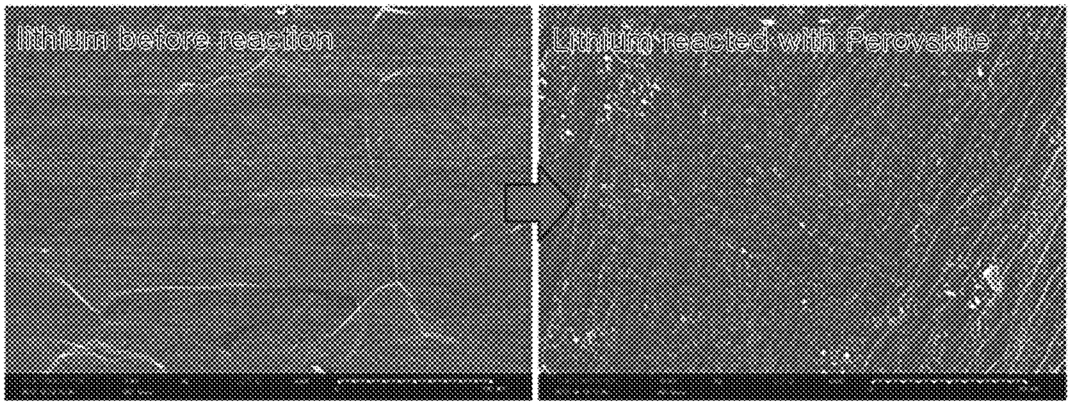
FIG. 4 illustrates an SEM image of a protective film of Example.
Figure 5:
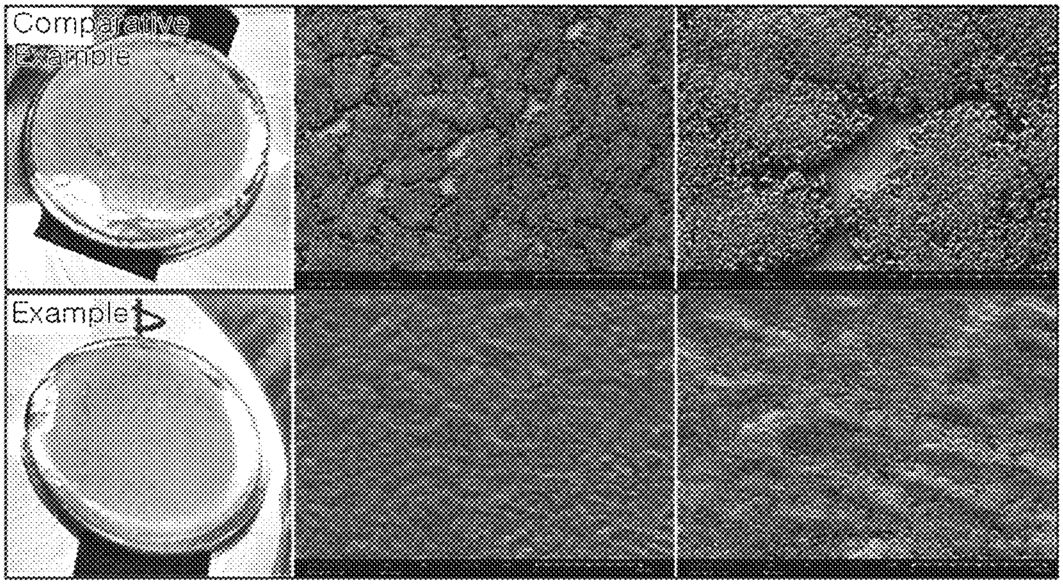
FIG. 5 illustrates SEM images after lithium electrodeposition of Example and Comparative Example.

The lithium metal anodes of Example 1 and Comparative Example 1 manufactured as described above were imaged with a scanning electron microscope (SEM) and the size, shape, and overall uniformity of the lithium metal were checked, which are shown in FIGS. 4 and 5.

Referring to FIG. 4, it can be seen that the lithium metal surface of Example 1 is covered with an anode protective film including a lithium salt and Sn—Li alloy, while, in Comparative Example 1, it can be seen that no anode protective film is formed on the surface.

In addition, referring to FIG. 5, it can be seen that, in Example 1, lithium is electrodeposited uniformly on every surface of the lithium metal, while, in Comparative Example 1, it can be seen that there were portions in which electrodeposition did not occur.

2. Nucleation Overpotential Evaluation

For the 2032 coin-type lithium metal symmetrical battery manufactured as described above, lithium corresponding to a capacity of 3 mAh per area was electrodeposited by applying a current of 3 mA per area.

Figure 6:
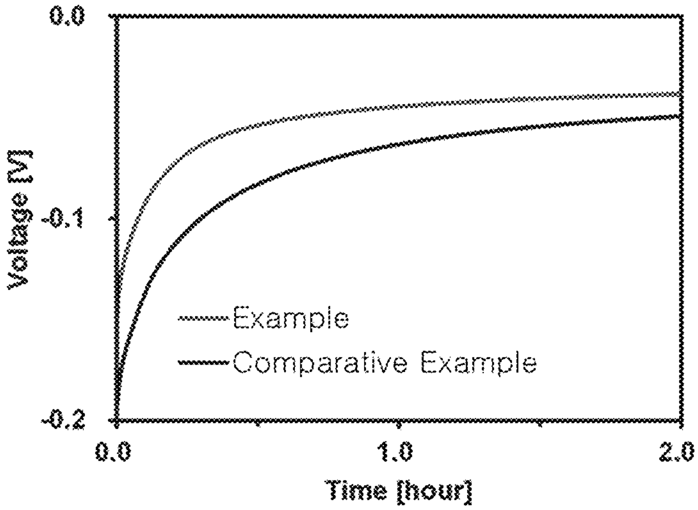
FIG. 6 is a graph illustrating nucleation overpotential measurement results of Example and Comparative Example.

Thereafter, a voltage changes over time that occurred during electrodeposition of lithium metal was measured, which is shown in FIG. 6 and Table 1 below.

TABLE 1

| | Voltage (V) | | |
|---|---|---|---|
| | 0 h (lowest voltage value) | 1.0 Hour | 2.0 Hour |
| Example 1 | −0.149 | −0.045 | −0.038 |
| Comparative Example 1 | −0.192 | −0.063 | −0.049 |

Referring to FIG. 6 and Table 1, it can be seen that the voltage at 0 h of the lithium metal electrode of Example 1 is closer to 0 than that of Comparative Example 1, resulting in a low nucleation overpotential.

In contrast, the lithium metal electrode of Comparative Example 1 did not have an anode protective film formed thereon, and although it is not intended to be bound by a specific theory, the surface is covered with a native film (Li-organic material, $Li_2CO_3$, $Li_2O$, LiOH, etc.) that may act as resistance to electrodeposition, and thus, the nucleation overpotential increased.

In an embodiment of the disclosed technology, the lithium metal anode inducing a uniform electrodeposition behavior and distribution of lithium ions and having excellent ion conductivity and mechanical strength may be provided.

In another embodiment of the disclosed technology, the lithium metal anode may be manufactured with high productivity by reducing process time and costs.

In another embodiment of the disclosed technology, the lithium metal anode including a protective film capable of effectively suppressing the growth of lithium dendrites by inducing a uniform distribution and reversible electrodeposition/dissolution behavior of lithium ions during an electrochemical reaction may be provided.

In another embodiment of the disclosed technology, the lifespan characteristics and electrochemical performance of a lithium metal battery may be improved.

The disclosed technology can be implemented in various electrochemical devices such as rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments are described. Variations, improvements and enhancements of the disclosed embodiments and other embodiments may be made based on the disclosure of this patent document.

What is claimed is:

1. A lithium metal anode comprising:

a lithium metal; and a protective film formed on one or more surfaces of the lithium metal and including a lithium salt, a lithium-metal alloy, and a metal halide perovskite, wherein the protective film is disposed between the lithium metal and a solid electrolyte layer that includes an argyrodite-based sulfide solid electrolyte, wherein the lithium-metal alloy in the protective film includes lithium and a lithiophilic metal selected from the group consisting of Ag, Sn, Za, and combinations thereof, and wherein the metal halide perovskite has an $ABX_3$ structure, wherein A is at least one of $Cs^+$ or $MA^+$ (methylammonium), B is at least one of $Sn^{2+}$, $Zn^{2+}$, or $Ag^+$, and X is at least one of $F^-$, $Cl^-$, $Br^-$, or $I^-$.

2. The lithium metal anode of claim 1, wherein the lithium salt is at least one of LiF, LiCl, LiBr, or LiI.

3. The lithium metal anode of claim 1, wherein the B is $Ag^+$.

4. The lithium metal anode of claim 1, wherein the lithium metal includes an alloy of lithium and a metal that includes aluminum, zinc, bismuth, cadmium, antimony, silicon, lead, tin, gallium, or indium.

5. The lithium metal anode of claim 1, wherein the argyrodite-based sulfide solid electrolyte includes at least one of a compound represented by $Li_{7-x}PS_{6-x}Cl_x$ ($0 \le x \le 2$), $Li_{7-x}PS_{6-x}Br_x$ ($0 \le x \le 2$), or $Li_{7-x}PS_{6-x}I_x$ ($0 \le x \le 2$).

6. The lithium metal anode of claim 1, wherein the argyrodite-based sulfide solid electrolyte includes at least one of $Li_6PS_5Cl$, $Li_{6.5}Sb_{0.5}Ge_{0.5}S_5I$, $Li_{5.7}PS_{4.7}Cl_{1.3}$, or $Li_{6.6}Sb_{0.5}Si_{0.6}S_5I$.

* * * * *